United States Patent [19]
Baker et al.

[11] Patent Number: 5,439,742
[45] Date of Patent: Aug. 8, 1995

[54] ELECTRICAL INSULATING VINYL HALIDE RESIN COMPOSITIONS

[75] Inventors: Paulette Baker, Chagrin Falls, Ohio; Richard F. Grossman, Shelton, Conn.

[73] Assignee: Synthetic Products Company, Shaker Heights, Ohio

[21] Appl. No.: 969,036

[22] Filed: Oct. 30, 1992

[51] Int. Cl.$^6$ .................................. B32B 9/00
[52] U.S. Cl. ................................. 428/389; 428/379; 428/380; 428/375; 428/929; 252/62; 252/62.3 R; 252/62.3 BT; 252/400.1; 252/570; 493/949; 525/419
[58] Field of Search ............... 428/373, 375, 380, 929, 428/379; 260/DIG. 43, 130; 252/396, 399, 407, 182.15, 174.23, 174.24, 51.5, 570, 62, 62.3 R, 63.3 BT, 400.1; 564/194; 493/949; 525/419, 389

[56] References Cited

U.S. PATENT DOCUMENTS

| | | | |
|---|---|---|---|
| 4,134,868 | 1/1979 | Minagawa et al. | 260/23 |
| 4,217,258 | 8/1980 | Minagawa et al. | 260/23 |
| 4,224,203 | 9/1980 | Minagawa et al. | 260/23 |
| 4,224,218 | 9/1980 | Minagawa et al. | 260/45.7 |
| 4,269,743 | 5/1981 | Hulyalkar et al. | 260/23 |
| 4,269,744 | 5/1981 | Hulyalkar et al. | 260/23 |
| 4,310,429 | 1/1982 | Lai | 252/51.5 |
| 4,814,369 | 3/1989 | Baker | 524/287 |
| 4,925,883 | 5/1990 | Baker | 524/287 |
| 4,983,688 | 1/1991 | Jennings et al. | 525/389 |

*Primary Examiner*—Patrick J. Ryan
*Assistant Examiner*—Merrick Dixon
*Attorney, Agent, or Firm*—Wood, Herron & Evans

[57] ABSTRACT

Electrical insulating compositions of vinyl halide resins (PVC) are formulated to contain a polymeric metal aromatic polycarboxylate as an electrical insulating additive. For example, polymeric calcium terephthalate is used in minor amounts of about 0.2 to 0.5 phr PVC to provide an excellent insulating effect. Lead stabilizers may be avoided in the polymer compositions and, instead, nontoxic metal salt heat stabilizers such as calcium, barium, zinc, etc., may be used.

12 Claims, No Drawings

ELECTRICAL INSULATING VINYL HALIDE RESIN COMPOSITIONS

BACKGROUND OF THE INVENTION

Compositions based on polyvinyl chloride (PVC) and other halogenated polymers, such as chlorinated polyethylene (CPE) and chlorosulfonated polyethylene (CSPE), are commonly used to insulate metal and other electrical conductors. Insulated products include residential and commercial building wire; portable power cord and fixture wires; automotive primary (harness) wire; telephone and other communications wires; instrument and appliance wires; motor lead wires, etc. Compositions based on halogenated polymers typically provide required flame resistance, oil resistance, and resistance to environmental factors such as ozone and ultraviolet light to a greater extent than would similar nonhalogenated polymers (e.g., olefin polymers and copolymers). Therefore, the use of compositions based on halogenated polymers in wire and cable is widespread.

A common feature of all compositions based on halogenated polymers is the presence of metal compounds that serve as heat stabilizers to capture HCl liberated during processing of the composition into its final shape. This processing requires shear at elevated temperatures, often as high as 150°–200° C., that invariably results in loss of HCl. It is necessary to scavenge HCl and to terminate heat and shear-initiated degradative reactions to produce suitable articles of commerce, including extruded wire coverings. The final product of the heat stabilization reaction is a metal chloride.

In addition to providing resistance to mechanical damage and attack by various media, the wire covering must be suitable electrically; that is, must be a good insulator. A typical test of effectiveness as an insulator is to measure volume resistivity of the composition, the unit resistance of the insulation to passage of electric current, per ASTM Standard D257. The volume resistivity of insulating compositions can be reduced by many orders of magnitude by physical influx of small amounts of water. The ingredients used in such compositions are chosen (as far as is practical) to be hydrophobic. The resistance of insulating compositions to loss of volume resistivity through water influx or absorption is commonly investigated by determining this property before and after 24 hours of immersion in water at 70° C. Most polymer compositions that contain standard metal stabilizers result in a severe loss of volume resistivity when tested per ASTM standard D257. For example, when a vinyl halide resin is stabilized with stearate salts of zinc, cadmium, tin, calcium, strontium, barium and antimony, volume resistivity of the polymer after hot water immersion is found to be greatly reduced.

Presently, the wire and cable industry has relied on insulating vinyl halide resins containing heat stabilizers based on lead compounds. Thus, electrically insulating polyvinyl chloride (PVC) compositions usually include dibasic lead phthalate, dibasic lead phosphite, tribasic lead sulfate, or lead stearate, among others, as heat stabilizers. With chlorinated polyethylene or chlorosulfonated polyethylene, litharge and red lead oxide are also used.

It is increasingly perceived that widespread use of lead compounds by the wire and cable industry can pose hazards to workers involved in product fabrication, and to the environment. Thus it is widely viewed as desirable to replace lead-based heat stabilizers in vinyl halide resins with others based on metals having a much lower order of toxicity. Heretofore this has not been possible because of the loss of insulating properties caused by the inclusion of less toxic heat stabilizer compounds of zinc, calcium, barium or tin, for example, in the polymer compositions.

SUMMARY OF THE INVENTION

The present invention is directed to electrical insulating vinyl halide resin compositions. It has been found that the electrical insulating properties of a vinyl halide resin composition having a metal compound stabilizer system can be improved by adding a polymeric polyvalent metal aromatic polycarboxylate as an electrical insulating agent in an effective insulating amount.

In a preferred embodiment, the insulating properties of an electric wire PVC covering are substantially improved by including a minor amount of about 0.2 to 5 parts polymeric calcium terephthalate (CaT). Furthermore, this insulating CaT additive functions with a metal heat stabilizer salt of a higher fatty acid where the metal is zinc, cadmium, tin, calcium, strontium, barium, and antimony. Thus, this invention permits the use of non-lead stabilizers. Stabilization is preferably based upon synergistic blends of barium and zinc, calcium and zinc, tin and calcium, etc., in electrical wire insulation based on halogenated polymers.

The invention provides for greatly improved retention of volume resistivity on exposure of such molded PVC compositions to electrical current. The function of the polyvalent metal polycarboxylate, such as calcium terephthalate, as an insulating additive in vinyl halide resin compositions is unexpected and surprising.

The invention is particularly applicable to vinyl halide polymer compositions in electric wire or cable applications. Other applications include wild life protectors, electrical component housings, electrical connectors, electrical plugs and the like. Lead-based stabilizer systems may be eliminated in wire and cable thereby eliminating hazards to workers involved in product fabrication and to the environment. In a broader aspect, the invention is applicable to all vinyl halide resin compositions where insulating properties are desired in the products. The invention in these broader aspects, as well as specific embodiments and other parameters, may be further understood with reference to the following detailed description.

Detailed Description of the Invention

A. Vinyl Halide Resin

The vinyl halide resin employed is most commonly a homopolymer of vinyl chloride, i.e., polyvinyl chloride. It is to be understood, however, that this invention is not limited to a particular vinyl halide resin such as polyvinyl chloride or its copolymers. Other halogen-containing resins which are employed and which illustrate the principles of this invention include chlorinated polyethylene, chlorosulfonated polyethylene, chlorinated polyvinyl chloride, and other vinyl halide resin types. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride $(CH_2CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinated polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

B. Metal Compound Heat Stabilizers

Metal compound heat stabilizers in vinyl halide resin compositions are well known. As developed above, and in the background of this invention, these metal compounds serve to capture HCl liberated during heat processing of the vinyl halide resin composition into its final shape. Normally, mixed metal salts are employed as heat stabilizing compositions. A mixed barium-zinc or calcium-zinc salt of a higher fatty acid may be employed. The salt component can also be a barium, cadmium, calcium, zinc, strontium, tin or antimony salt. The salt components are usually metal salts of a carboxylic acid, advantageously of a $C_8$–$C_{24}$ carbon chain link monocarboxylic acid such lauric, oleic, stearic, octoic, or similar fatty acid salts. Mixed barium/zinc or calcium/zinc salts of such acids, and their preparation, are familiar to those skilled in the art to which this present invention pertains.

C. Polymeric Polyvalent Metal Salts of Aromatic Polycarboxylic Acids

The polymeric polyvalent metal aromatic polycarboxylates suitable for use in accordance with the principles of this invention may be derived from a broad class of compounds. In short, the term "polymeric metal carboxylate" is used hereinafter to define a member of this class.

The polymeric polyvalent metal salts are divalent, trivalent or higher valent metal salts of aromatic polycarboxylic acids exemplified by terephthalic, trimellitic, pyromellitic, trimeric and 2,6-naphthalene dicarboxylic acids. The metal cations of these salts include divalent calcium, magnesium, cadmium, zinc, lead, cobalt, strontium, barium, nickel, copper and tin ions; and the trivalent aluminum, cerium, indium, iron, cesium and chromium ions. Preferably, the metal cations include calcium, magnesium, strontium, barium, zinc and aluminum. Polyfunctional aromatic polycarboxylic acids useful in accordance with the principles of this invention may be exemplified by the aromatic nucleus of benzene, naphthalene, anthracene or the like. In a preferred form, the polymeric metal carboxylate includes the 1,4-benzene dicarboxylate group in the polymeric structure.

The essential criteria for the polymeric polyvalent metal salts of this invention are the polymeric nature of the aromatic polycarboxylate and its thermal stability at processing temperatures of the vinyl halide resin. Thus, it will be understood that while a number of polymeric salts have been actually exemplified hereinafter, others may be used to accomplish the purposes of this invention. It is believed that certain salts exist as substantially linear polymers in the divalent metal-dicarboxylate form with the equivalence of the oxygens bonded to the metal ion. However, other forms may be crosslinked where the functionality of the metal and carboxylates admit of crosslinking. Thus, the term "polymeric metal carboxylate" has been adopted to herein define this general class useful according to the broader aspects of the compositions and methods of this invention. The class of polymeric metal carboxylates suitable for use according to this invention all are characterized by heat stability at the processing temperatures of the vinyl halide polymer. The heat stabilities of polymeric metal terephthalate salts are exemplified by the decomposition temperatures listed in the following Table.

| Decomposition Temperatures of Polymeric Metal rerephthalates | |
|---|---|
| Metal | Decomposition Temperature |
| Aluminum | 540° C. |
| Barium | 640° C. |
| Cadmium | 430° C. |
| Calcium | 620° C. |
| Cobalt | 475° C. |
| Magnesium | 625° C. |
| Lead | 425° C. |
| Nickel | 440° C. |
| Strontium | 630° C. |
| Zinc | 430° C. |

All determine by means of TGA (termoravimetric analysis) under nitrogen at a heating rate of 10° C./minute.

Other polymeric metal carboxylates including polymeric metal terephthalates, trimesates, trimellitates, pyromellitates, isophthalates and others are disclosed in U.S. Pat. No. 4,983,688 and that disclosure is incorporated herein by reference.

D. Amounts of Components

Broad ranges of components of the vinyl halide resin compositions may be employed in the invention. In general, the polymeric metal carboxylate is used in an insulative amount in the vinyl halide resin composition. Particularly useful compositions of the invention are achieved containing about 0.5 to about 5 parts of the metal compound heat stabilizer, about 0.2 to about 5 parts of the polymeric metal carboxylate, said parts on the basis of 100 parts of vinyl halide resin. The compositions of the present invention can also include various additional compounds including lubricants for providing the vinyl halide resin with lubricity and plasticizers of the phthalic ester or fatty acid ester type, hydrocarbon resins or chlorinated olefins or paraffins. Other additives may include auxiliary stabilizers, antioxidants, light stabilizers, pigments, dyes or extenders as disclosed in U.S. Pat. Nos. 4,269,743; 4,269,744; 4,814,369 and 4,925,883. The compositions may optionally contain an inorganic acid acceptor, such as various hydrotalcites and Type A hydrous zeolites, or coordinating multidentate metal blend ligands, such as 1,3-diketone, or an antioxidant such as bisphenol A, or a phosphite costabilizer such as diphenyl decyl phosphite. Fillers may be added including coarse ground limestone, fine ground limestone, clay, talc or other particulate fillers.

The advantages of this invention and its operating parameters will be further understood with reference to the following detailed examples.

Example 1

A typical insulation that would be used in building wire was prepared on a 2-roll mill by mixing on a parts basis, PVC 100; calcium carbonate 10; kaolinite clay 10;

tri-iso-nonyl trimellitate 25; diundecyl phthalate 20, paraffin wax 0.3; bisphenol A 0.2; dibasic lead phthalate 7. The volume resistivity of this composition was 1120×10(12) ohm-cm. After exposure to water for 24 hours at 70° C., and cooling to room temperature, the volume resistivity was 810×10(12) ohm-cm. This order of retention would be satisfactory in commercial use.

Example 2

The composition of Example 1 was prepared except that dibasic lead phthalate was omitted. Instead, the following parts of ingredients were added: barium laurate 1.75; zinc laurate 0.4; hydrotalcite acid acceptor 3.0; dibenzoyl methane 0.05. These comprise a typical non-lead stabilizer that would be useful in the above composition, if no exposure to hot water were required. This composition had a volume resistivity of 970×10(12) ohm-cm, which is satisfactory. After 24 hour immersion in 70° C. water and cooling to room temperature, this composition had, however, a volume resistivity of only 0.6×10(12) ohm-cm. Thus, it had lost three orders of magnitude in one day. Wire insulated with such a composition would, if submerged in water, eventually fail through progressive loss of volume resistivity to a point where the insulation would conduct a measurable current. Such failures can pose substantial danger.

Example 3

To the composition of Example 2 was added 2.0 phr of calcium terephthalate, a polymeric salt of the above class of polymeric metal carboxyltes. The volume resistivity of this composition was 1060×10(12) ohm-cm. After 24 hour exposure to water at 70° C. and cooling to room temperature, the volume resistivity was 950×10(12) ohm-cm, a substantially higher level than that found with the stabilizer used in Example 2.

Example 4

The following building wire insulation composition was prepared under actual factory conditions by mixing, on a part basis, PVC 100; kaolinite clay 12; antimony oxide 1.5; diundecyl phthalate 21.5; tri-iso-nonyl trimellitate 21.5; epoxidized soybean oil 2; phenolic antioxidant 0.2; pentaerythritol distearate 0.7; tribasic lead sulfate 4.0. The volume resistivity of this composition was 70× 10(13) ohm-cm. After 24 hours in water at 70° C. and cooling to room temperature, the volume resistivity was 42×10(13) ohm-cm.

Example 5

The compound of Example 4 was prepared under factory conditions but tribasic lead sulfate omitted. Instead, the following parts were added: barium laurate 1.0; zinc laurate 0.25; hydrotalcite acid acceptor 2.0; dibenzoyl methane 0.05. The volume resistivity of this composition was also 70×10(13) ohm-cm. After 24 hours in water at 70° C. and cooling to room temperature, the volume resistivity was 0.5×10(13) ohm-cm, an unacceptable level of loss.

Example 6

The compound of Example 4 was prepared but tribasic lead sulfate omitted. Instead the following parts were added; barium laurate 0.8; zinc laurate 0.2; hydrotalcite 1.7; dibenzoyl methane 0.04; calcium terephthalate 0.8. The volume resistivity of this composition was also 70×10(13) ohm-cm. After 24 hours in water at 70° C. and cooling to room temperature, the volume resistivity was still 30×10(13) ohm-cm due to the insulating effect of calcium terephthalate used in this experiment, even when used in such a minor amount.

The above data demonstrates that minor amounts of a polymeric metal aromatic polycarboxylate such as polymeric calcium terephthalate will unexpectedly and surprisingly behave as an insulating additive in vinyl halide resin compositions. However, other polymeric metal carboxylates may be used in accordance with the above description in other vinyl halide resin compositions. The above examples are not intended to limit the invention.

Having described this invention, its advantages and operating parameters, it will be obvious to persons of ordinary skill in the art, in view of the above description, that variations hereof may be made without departing from the spirit and scope thereof.

What is claimed is:

1. An electrical insulating vinyl halide resin composition comprising a vinyl halide resin, a metal compound stabilizer selected from a group consisting of antimony, barium, cadmium, calcium, zinc and mixtures thereof for said resin and a polymeric polyvalent metal aromatic polycarboxylate polymeric calcium terephthalate as an electrical insulating agent in an effective electrically insulating amount.

2. The composition of claim 1 wherein said vinyl halide resin is selected from the group of polyvinylchloride, chlorinated polyethylene and chlorosulfonated polyethylene.

3. The composition of claim 1 wherein said metal compound stabilizer is present in an amount from about 0.5 to about 5 parts and said polymeric polycarboxylate is present in an amount from 0.2 to about 5 parts and said vinyl halide resin is present in amount of about 100 parts.

4. An insulating product produced from the composition of claim 1.

5. An extruded electrical insulating wire or cable product having a conductor and an outer covering of the insulating composition of claim 1.

6. An electrical insulating vinyl halide resin composition comprising a polymer or copolymer of vinyl chloride, a metal salt of a higher fatty acid selected from the group consisting of zinc, cadmium, tin, calcium, strontium, barium, and antimony, and mixtures of said metal salts, and a polymeric polyvalent metal aromatic polycarboxylate polymeric calcium terephthalate as an electrical insulating agent in an effective electrically insulating amount.

7. The composition of claim 6 wherein said polymeric polycarboxylate includes the 1,4-benzene dicarboxylate group in the polymeric structure.

8. The composition of claim 6 wherein the fatty acid is selected from the group consisting of stearic, oleic, octoic and lauric acids.

9. The composition of claim 6 wherein said polymeric polycarboxylate is in an amount of from about 0.2 to about 5 parts per 100 parts resin.

10. An electrical insulating product produced from the composition of claim 6.

11. An extruded electrical insulating wire or cable product having a conductor and an outer covering of the insulating composition of claim 6.

12. An extruded electrical insulating wire or cable product having a conductor and an outer covering of the insulating composition of claim 6.

* * * * *